Patented Jan. 11, 1949

2,458,656

UNITED STATES PATENT OFFICE 2,458,656

ESTERS OF PIPERONYL CHRYSANTHEMUM CARBOXYLIC ACID

Martin E. Synerholm, Hastings on Hudson, N. Y., assignor to Boyce Thompson Institute for Plant Research, Inc., a corporation of New York No Drawing. Application March 26, 1946,
Serial No. 657,349

3 Claims. (Cl. 260—338)

This invention relates to organic compounds and has for its object the provision of a new compound and insecticidal compositions comprising the new compound. The new compound of my invention is the piperonyl ester of chrysanthemum carboxylic acid (2,2-dimethyl-3-isobutenyl cylcopropane-1-carboxylic acid). This compound may be prepared from piperonyl alcohol and chrysanthemum carboxylic acid. The chrysanthemum carboxylic acid may be derived as a natural product from plants, for example, from *Chrysanthemum cinerariifolium* Bocc., or it may be prepared synthetically. The compound derived from plants is largely or wholly the d-trans isomer, while the synthetic compound is a mixture of several isomers, namely, the four isomeric d,l-cis and d,l-trans acids.

I have made the significant discovery that the synthesized mixture of four isomer d,l-cis, and d,l-trans acids is equally as effective as the d-trans isomer from pyrethrins from the plant *Chrysanthemum cinerariifolium* occurring naturally and that it is, accordingly, not necessary to separate the isomers to produce an ester from separate isomers. The synthesized mixture may be made by starting with methallylchloride from which 2,5-dimethylhexadiene-1,5 is prepared. This compound is isomerized to 2,5-dimethyl-hexadiene-2,4 which, with diazo-acetic ester, yields the ethyl ester of chrysanthemum carboxylic acid. This ester is saponified to the free acid. There is practically no difference in effectiveness, when tested against houseflies (*Musca domestica*) in the large group Peet-Grady chamber, between the isomeric mixture of synthetic origin and the ester prepared from the d-trans acid obtained from a plant source.

The piperonyl alcohol may be obtained by reduction of piperonal, an oxidation product of isosafrol or other $\alpha$-$\beta$ unsaturated 3-4 methylene dioxyphenyl compounds.

The piperonyl ester of my invention may be synthesized by adding piperonyl alcohol to an equivalent amount of the acid chloride of chrysanthemum carboxylic acid prepared by the action of thionyl chloride or other chlorinating agent on the acid in any suitable form such as the d-trans isomer from the flowers or the mixture of d,l-cis and d,l-trans acids prepared synthetically. The ester may be prepared by any other means of effecting esterification.

The compounds of the invention are readily soluble in the petroleum distillates commonly used as solvents in insecticidal sprays, such as Deo-Base. They may be incorporated in powders such as talc to form insecticidal dusts, or used as mists or aerosols. The compound of the invention may be mixed with pyrethrins, piperine, or DDT to produce compositions exhibiting synergism.

Spray solutions containing the compounds of the invention were tested against houseflies by the large Group Peet-Grady Method ("Blue Book" pp. 177–181, McNair-Dorland Co., New York, 1939). Control tests with the Official Test Insecticide (OTI) (Soap and Sanitary Chemicals 21 (6): 137, 141, June, 1945), which contains approximately 0.1 g. of pyrethrins per 100 ml., also were carried out on each batch of flies used. The compound was dissolved in Deo-Base, a purified petroleum distillate.

Table I describes the materials and quantities used and the results of the tests:

Table I

| Derivative of Chrysanthemum Carboxylic Acid | G. per 100 ml. | G. Pyrethrins per 100 ml. | G. DDT per 100 ml. | Per Cent Kill | Per Cent Knockdown | O. T. I. Per Cent Kill |
|---|---|---|---|---|---|---|
| Piperonyl ester (from d-trans acid) | 1.0 | 0.05 | | 95 | | 44 |
| Do | 1.0 | | | 93 | 97 | 53 |
| Do | 0.5 | 0.05 | | 76 | | 51 |
| Do | 0.5 | | | 66 | 95 | 49 |
| Piperonyl ester (from synthetic mixture) | 1.0 | | | 90 | 95 | 49 |
| Do | 0.5 | | | 52 | 93 | 59 |
| Do | 0.5 | | 0.10 | 95 | 95 | 60 |
| Do | 0.25 | | 0.10 | 82 | 85 | 52 |
| Do | 0.125 | | 0.10 | 79 | 86 | 60 |

Table II illustrates the similar effectiveness of the compounds formed of the natural and the synthetic chrysanthemum carboxylic acids when used with piperine:

*Table II*

| Derivative of Chrysanthemum Carboxylic Acid | G. per 100 ml. | G. Piperine per 100 ml. | Per cent Kill | Per cent Knockdown | O. T. I. Per cent Kill |
|---|---|---|---|---|---|
| Piperonyl ester—natural | 0.5 | 0.25 | 94 | 96 | 53 |
| Piperonyl ester—synthetic | 0.5 | 0.25 | 90 | 92 | 53 |
| Piperonyl ester—natural | 0.25 | 0.125 | 72 | 92 | 53 |
| Piperonyl ester—synthetic | 0.25 | 0.125 | 73 | 82 | 53 |
| Piperonyl ester—natural | 0.25 | 0.125 | 77 | 93 | 61 |
| Piperonyl ester—synthetic | 0.25 | 0.125 | 84 | 89 | 61 |

Tests with the piperonyl ester of chrysanthemum carboxylic acid on *Aphis rumicis* on nasturtium plants were carried out with water sprays using sodium lauryl sulfate as an emulsifier after dissolving the ester in acetone. The results are shown in Table III.

*Table III*

| Concentration of Ester | No. Dead | No. Alive | Total Insects | Per cent Dead in 24 hours |
|---|---|---|---|---|
| 1% | 139 | 12 | 151 | 92.0 |
| 0.5% | 147 | 43 | 190 | 77.3 |
| Check Spray | 5 | 72 | 77 | 6.4 |

The same spray composition, used in the tests of Table III, was used on pea-aphid on broad bean plants with the results shown in Table IV:

*Table IV*

| Concentration of Ester | No. Dead | No. Alive | Total Insects | Per cent Dead in 24 hours |
|---|---|---|---|---|
| 1% | 87 | 3 | 90 | 96.6 |
| 0.5% | 124 | 6 | 130 | 95.3 |
| Check Spray | 6 | 106 | 112 | 5.3 |

I claim:
1. The compound piperonyl ester 2,2-dimethyl-3-isobutenyl cyclopropane-1-carboxylic acid.
2. An insecticidal composition comprising the ester of piperonyl alcohol and the d-trans isomers of chrysanthemum carboxylic acid.
3. An insecticidal composition comprising the ester of piperonyl alcohol and the d,l-cis and d,l-trans isomers of chrysanthemum carboxylic acid.

MARTIN E. SYNERHOLM.

REFERENCES CITED

The following references are of record in the file of this patent:

West: Chemistry and Industry, August 12, 1944, pages 290 to 294.